United States Patent
Ko

(10) Patent No.: US 6,247,496 B1
(45) Date of Patent: Jun. 19, 2001

(54) DIVERTING VALVE FOR MIXING FAUCET

(75) Inventor: Hsi-Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 0 days.

(21) Appl. No.: 09/629,863

(22) Filed: Aug. 1, 2000

(51) Int. Cl.⁷ .................................................. F16K 11/06
(52) U.S. Cl. ...................................... 137/625.31; 251/175
(58) Field of Search ......................... 137/625.31; 251/175

(56) References Cited

U.S. PATENT DOCUMENTS

| | | | |
|---|---|---|---|
| 4,915,352 | * 4/1990 | Hochstrasser | 251/175 |
| 5,348,042 | * 9/1994 | Wagner et al. | 137/237 |
| 5,918,626 | * 7/1999 | Strong et al. | 137/454.5 |

* cited by examiner

Primary Examiner—John Fox
(74) Attorney, Agent, or Firm—Bacon & Thomas, PLLC

(57) ABSTRACT

An improved diverting valve has a valve body, a valve control stem, an upper control valve unit and a lower control valve unit, a seal cap and a locking cap. The valve body and the valve control stem are integrally formed of plastics. The lower control valve unit is provided with oil reservoir cavities and oil grooves so as to permit the upper control valve unit and the lower control valve unit to be lubricantly engaged with each other. The flexible seal cap has tapered flange and a concentrically-ribbed bottom surface so that it can be better sealed in operation. The assembly of the diverting valve is simple and speedy and the operation thereof is smooth and durable.

3 Claims, 2 Drawing Sheets

US 6,247,496 B1

DIVERTING VALVE FOR MIXING FAUCET

BACKGROUND OF THE INVENTION

The present invention relates to a water diverting valve which mainly has a valve body, a valve control stem, an upper control valve unit and a lower control valve unit, a seal cap and a locking cap. The valve body and the valve control stem are integrally formed of plastics. The lower control valve unit is provided with oil reservoir cavities and oil grooves so as to permit the upper control valve unit and the lower control valve unit to be lubricantly engaged with each other in rotation. The flexible seal cap has tapered flange and a concentrically-ribbed bottom surface so that it can be better sealed in operation. The assembly of the diverting valve is simple and speedy and the operation thereof is smooth and durable.

It is well known that there are many prior art diverting valves sold in markets all over the world. In general, the structures of those conventional valves mainly applied to faucets of all kinds are common. They are all made up of a valve body, a valve control stem, a seal ring, a retaining block, an upper control valve unit and a lower control valve unit, a small seal ring, a large seal ring and a side seal ring. Such prior valves have some disadvantages in practical use given as follows:
1. The valve body and the valve control stem are complicated in structure and must be assembled together piece by piece, resulting in high cost of production and difficulty in practical assembly. It becomes difficult to mass produce such diverting valves.
2. The large seal ring is easily deformed under high pressure, so the faucet is easily subject to leakage in use.
3. The retaining blocks are usually made of metal, resulting in a handle of a faucet being difficult to operate.

SUMMARY OF THE INVENTION

Therefore, the primary object of the present invention is to provide an improved diverting valve wherein the main control valve body and the valve control stem are integrally made of plastics without further manual processing so that they can be easily assembled with speed and produced at low cost.

Another object of the present invention is to provide an improved diverting valve wherein a flexible seal cap is used to better protect the valve from leakage in operation.

One further object of the present invention is to provide an improved diverting valve which is provided with a flexible seal cap, permitting a handle of a faucet to be operated with readiness and smoothness.

One still further object of the present invention is to provide a diverting valve wherein an upper control valve unit and a lower valve unit that are smoothly engaged with each other by way of lubricating oil, permitting the valve to operate in a longer and smoother manner.

DETAILED DESCRIPTION OF THE PREFERRED EMBODIMENTS

Figures 1, 1A, 1B:
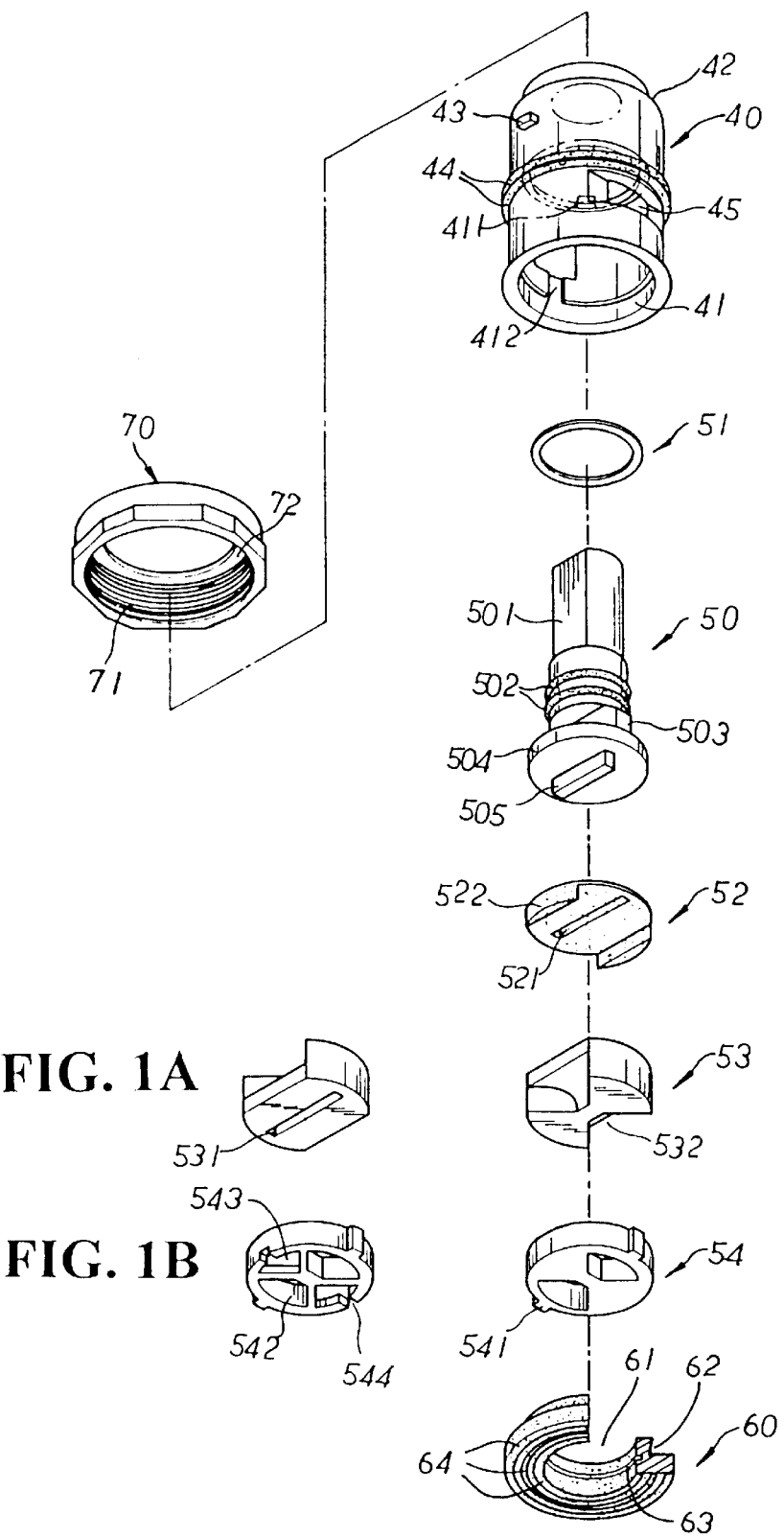
FIG. 1 is a perspective diagram showing the exploded components of the present invention.
FIG. 1A is a diagram showing a reverse side of the upper control valve unit.
FIG. 1B is a diagram showing a reverse side of the lower control valve unit.

Referring to FIGS. 1, 1A, 1B, the present invention comprises an improved diverting valve body 40, a valve control stem 50, a sealing ring 51, a round restraint disc 52, an upper control valve unit 53, a lower control valve unit 54, a seal cap 60 and a locking cap 70.

The diverting valve body 40 integrally formed of plastics is a short cylinder. The diverting valve body 40 has a 3-stage receiving chamber 41 having a downwardly facing opening at the bottom end thereof. The upper section has a smaller diameter and shorter length and the lower section has a larger diameter and longer length with a stop shoulder formed therebetween. A limiting shoulder 42 is defined at the topmost end of the diverting valve body 40. There are a pair of symmetric limiting protrusions 43 disposed under the limiting shoulder 42 on the external surface at the top section thereof. On the inner surface of the inner surface of the receiving chamber 41 are there a pair of extended retaining blocks 411. At the top of the receiving chamber 41 is disposed a valve stem hole. A pair of seal rings 44 are disposed on the external surface of the middle of the diverting valve body 40. Two water outlets 45 communicating with the valve chamber 41 are symmetrically disposed right under the seal rings 44. On the internal surface of the valve chamber 41 and under the water outlets 45 at the middle section of the valve chamber 41 are disposed a pair of symmetric positioning grooves 412.

The valve control stem 50 integrally made of plastics is provided with a connecting section 501 which can be engaged with a handle of a faucet, a pair of sealing ring sections 502 disposed right above a retaining section 503 and a round stop bottom 504 having a larger diameter to form a stop flange section. At the center of the underside of the round stop bottom 504 is disposed a protruded driving rib 505.

The round restraint disc 52 is equipped with a rectangular through hole 521 at the center and two parallel side stop walls 522 on the periphery thereof.

The upper control valve unit 53 is a cylindrical block having two parallel flat-cut sides and has a rectangular engagement cavity 531. As shown in FIG. 1A, a quarter-circular water inlet recess 532 of proper depth extends inwardly toward the center of the upper control valve unit 51 from each flat-cut side and has a curved bottom.

The lower control valve unit 54 is a round disc having a pair of symmetric retaining protrusions 541 disposed on a peripheral surface thereof. A pair of center symmetric quarter-circular water inlet 542 and a pair of center symmetric quarter-circular oil reservoir chambers 543 of proper depth for accommodation of lubricating oil. An air releasing groove 544 in communication with each oil reservoir chamber 543 is defined on the peripheral edge so that when the upper control valve unit 53 and the lower control valve unit 54 are rotatably engaged, they will be smoothly and easily moved relatively with each other in operation as a result of reduction of frictional resistance therebetween.

The seal cap 60 having a two-staged circular structure is flexible in nature and provided with a central water inlet hole 61. The seal cap 60 is small of its upper portion and is large of its lower portion and has a tapered periphery 62 defined between the upper and lower portions. At the central water inlet hole 61 is disposed a flexible ring groove 63 and a tapered and outwardly enlarged introduction face. On the underside of the large portion of the seal cap 60 are disposed a plurality of concentric ribs 64.

The locking cap 70 has an internally threaded central through hole 71 with a peripheral shoulder 72 disposed at the top end of the central through hole 71. The diameter of the peripheral shoulder 72 is slightly smaller than the outer diameter of the limiting shoulder 42 of the diverting valve body 40.

Figure 2:
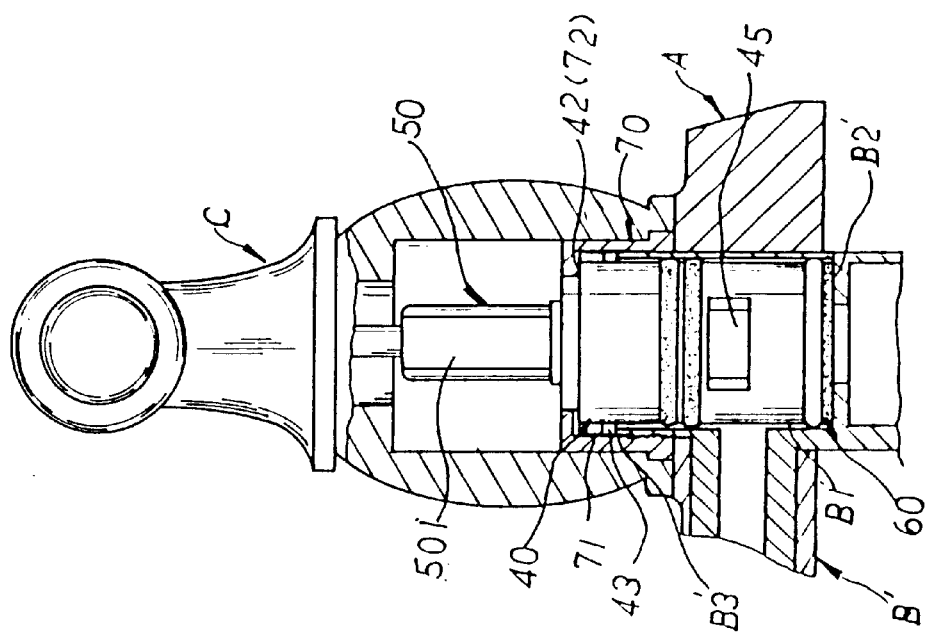
FIG. 2 is a sectional diagram showing the structure of the present invention.

In assembly, as shown in FIG. 2, the sealing ring 51 is attached to the round stop bottom 504 of the control valve stick 50 which is housed in the valve chamber 41 of the diverting valve body 40 with the connection section 501 stuck out of a stem hole disposed at the top of the diverting valve body 40. The retaining section 503 is just fit in-between the retaining blocks 411 and can only move in 90 degrees. The engagement cavity 531 of the upper control valve unit 53 is registered with the protruded driving rib 505 of the valve control stem 50 and the two side stop walls 522 of the round restraint disc 52 are in abutment against the two parallel flat-cut sides of the upper control valve unit 53.

The lower control valve unit 54 is smoothly guided into the valve chamber 41 of the diverting valve body 40 with the symmetric retaining protrusions 541 registered with the positioning grooves 412 of the valve body 40; at the same time, the side with the oil reservoir chambers 543 and the grooves 544 of the lower control valve unit 54 faces the valve chamber 41 is in lubricating contact with the bottom side of the upper control valve unit 53. Then the tapered flange 62 of the small diameter section of the seal cap 60 is stuffed into the valve chamber 41 of the diverting valve body 40 to complete the assembly.

Figure 3:
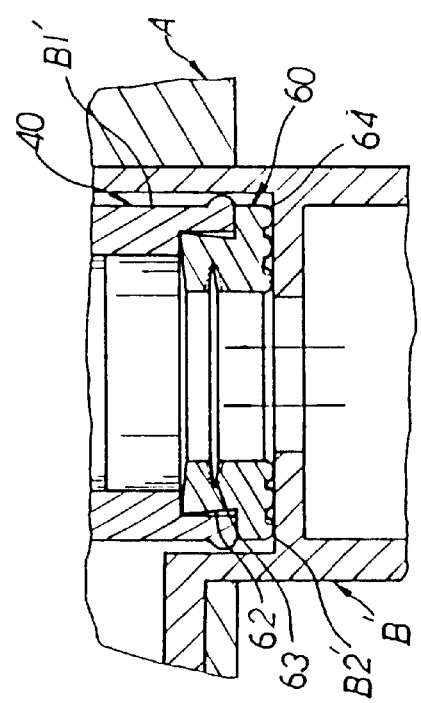
FIG. 3 is a sectional diagram showing the mounting of the present invention to a faucet.

Referring to FIG. 3, when the diverting valve is to be housed in a faucet, the handle base A is registered with the a faucet body B', and then the assembled diverting valve body is directly housed in a chamber B1' of the faucet body B' with the guide blocks 43 of the diverting valve body 40 registered with a cut B3' on each two symmetric sides of the chamber B1' of the faucet body B'. Afterwards, the internal threads 71 of the locking cap 70 permit the cap 70 to be secured to the externally threaded chamber B1' of the faucet body B', allowing the peripheral shoulder 72 of the locking cap 70 to abut against the assembled diverting valve body so as to force the same in the chamber B1' of the faucet body B'. At the moment, the flexible seal cap 60 is compressed to make the tapered periphery 62 inwardly contracted and the concentrically-ribbed bottom 64 to be outwardly expanded. Thereby it can be fixed in abutment against the stop shoulder B2' of the faucet body B'. At last, an operational handle C is mounted onto the top end of the faucet body B'.

In summary, the present invention has the following advantages:

1. The flexible ring groove 63 keeps a downwardly extended clearance space and the tapered periphery 62 offers an inwardly compressible space whereby the diverting valve body 40 can be operated downwardly with larger force to make the handle operated in a smooth and easy manner.
2. The flexible seal cap 60 is more resilient and adjustably expanded and retracted so that it can be firmly and closely engaged with the abutment flange B2' of the faucet body B' without bending into deformation under high pressure, producing effective seal purpose.
3. The bottom of the seal cap 60 can be in flat contact with the stop shoulder B2' of the faucet body B' so as to effectively seal a faucet in operation.
4. Only one integral piece of a seal cap 60 is used to effect sealing purpose so as to make the assembly easy and production and processing cost reduced.

I claim:

1. A diverting valve for use in a faucet, comprising a diverting valve body, a valve control stem, a sealing ring, a round restraint disc, an upper control valve unit, a lower control valve unit, a seal cap and a locking cap;

said valve control stem being removably engaged with said upper control valve unit;

said upper control valve unit being placed relatively rotatable against said lower control valve unit;

said lower control valve unit being secured to an interior of said diverting valve body;

said valve control stem, said upper control valve unit, said lower control valve unit being housed in sequence in said diverting valve body;

said flexible seal cap having a central water inlet hole being engaged with a bottom end of said diverting valve body;

said locking cap having a central internally threaded hole having a diameter slightly smaller than a diameter defined by a pair of external guide blocks on an external wall of said diverting valve body;

said valve control stem being led through said central hole of said locking cap so that said valve assembly can be secured in place in a faucet mount;

wherein said diverting valve body is a two-staged cylinder; a lower portion of said diverting valve body has an open-ended 3-staged valve chamber which is provided with a quarter-circularity extended retaining block and is in communication with a valve stem hole at the top end thereof;

said upper control valve unit is a cylindrical block having two parallel flat-cut sides and has a rectangular engagement cavity, a quarter-circular water inlet recess extends inwardly toward the center of said upper control valve unit from each flat-cut side;

said valve control stem is provided with a connecting section, a retaining section, a pair of sealing ring sections disposed right under the retaining section and a round bottom having a larger diameter to form a stop flange section; at the center of the underside of said stop flange section is disposed a protruded driving rib and a pair of retaining protrusions;

a middle stage of said valve chamber is intermediate of its diameter and length; a lower stage thereof has a larger diameter and shorter length and on an external surface thereof are symmetrically disposed a pair of guide blocks; a pair of seal rings are disposed on an external surface at the middle of said diverting valve body; two water outlet communicating with said valve chamber are disposed right under said seal rings; a plurality of axially extended reinforcement ribs are peripherally disposed on the external surface of the lower stage of the diverting valve body; on the internal surface of the valve chamber and adjacent to the bottom end thereof are disposed a pair of symmetric positioning grooves;

said seal cap having a two-staged circular structure is flexible in nature and provided with a central water inlet hole; said seal cap is small of its upper portion and is large of its lower portion and has a tapered periphery defined between said upper and lower portions;

at the central water inlet hole is disposed a flexible ring groove and a tapered and outwardly enlarged introduction face; on the underside of the large portion of said seal cap are disposed a plurality of concentric ribs;

said locking cap has an internally threaded central through hole with a peripheral shoulder disposed at the top end of the central through hole; the diameter of said peripheral shoulder is slightly smaller than the diameter of said diverting valve body.

2. The diverting valve for use in a faucet as claimed in claim 1 wherein said diverting valve body has a reduced diameter section so as to form a limiting shoulder defined at the top end thereof and a pair of limiting protrusions disposed oppositely on the periphery of said valve body.

3. The diverting valve for use in a faucet as claimed in claim 1 wherein said lower valve control unit has a pair of quarterly-circular reservoir cavities that are center symmetrically disposed for accommodation of lubricant; a gas releasing groove is disposed on a periphery of each said reservoir cavity whereby said lower valve control unit can be in rotatable contact with said upper valve control unit smoothly and easily.

* * * * *